Nov. 16, 1948.     H. M. MARC     2,454,074
MANUFACTURE OF DUCT TURNS OR VANES
Filed Feb. 8, 1946     2 Sheets—Sheet 1
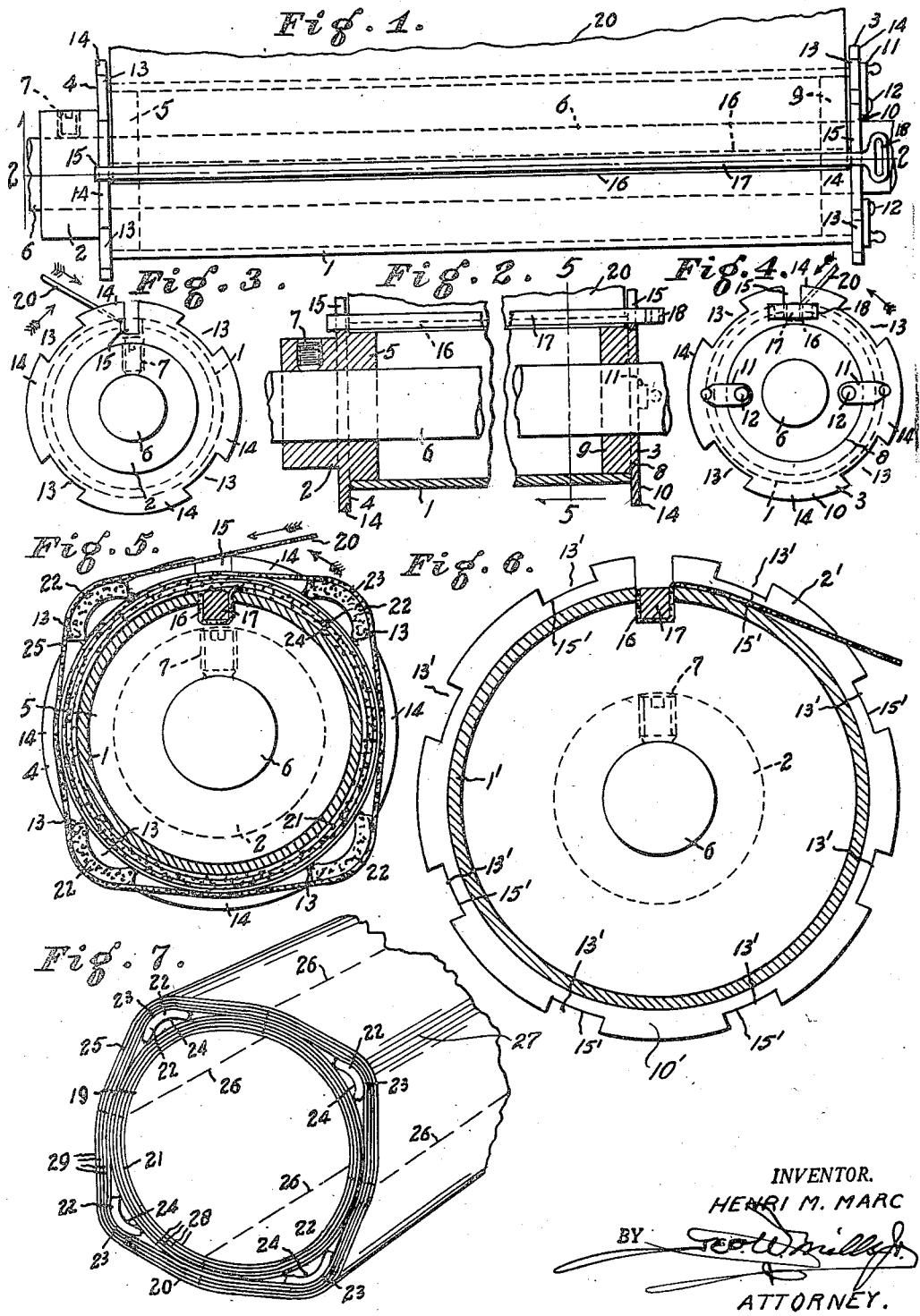
INVENTOR.
HENRI M. MARC

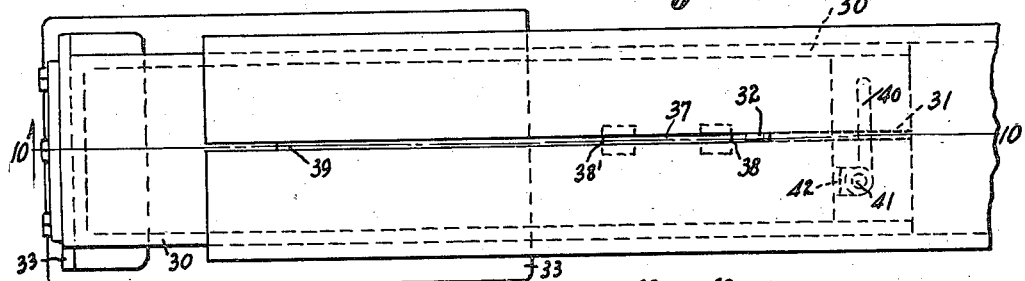
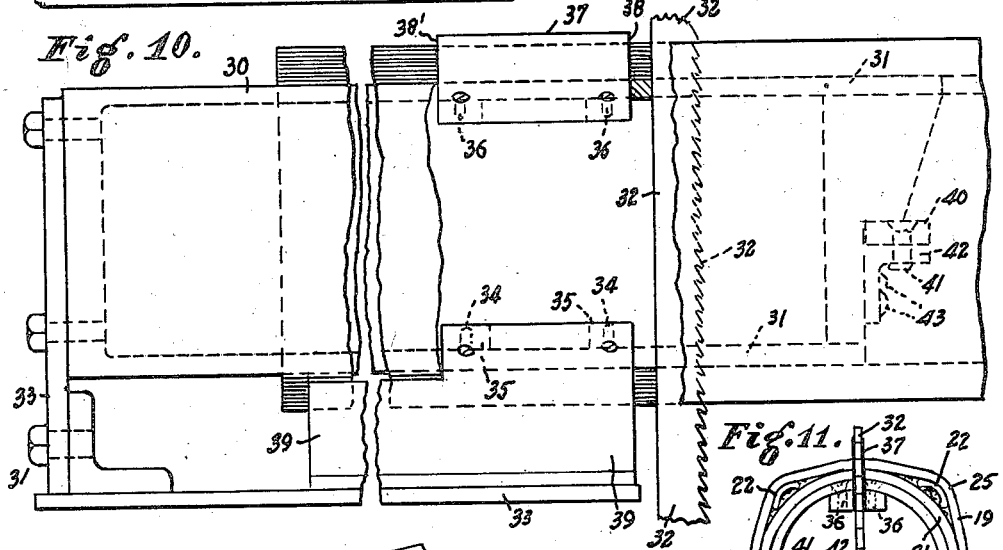
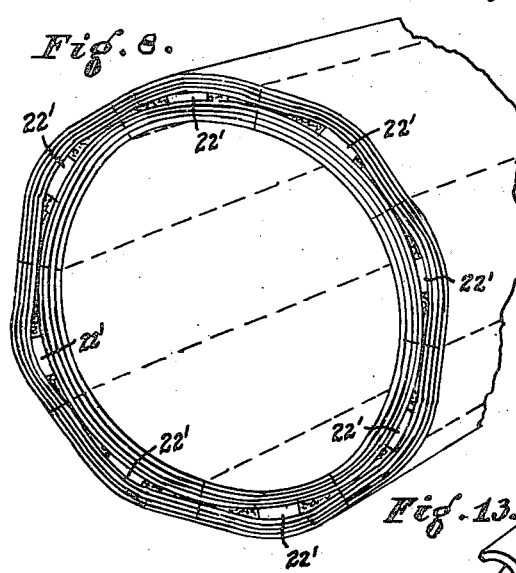
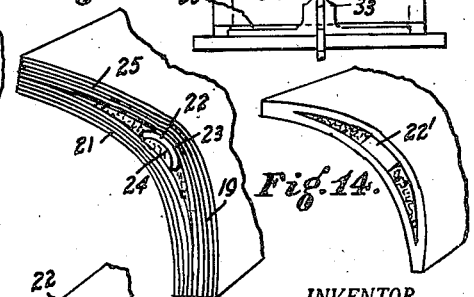

Patented Nov. 16, 1948

2,454,074

UNITED STATES PATENT OFFICE 2,454,074

MANUFACTURE OF DUCT TURNS OR VANES

Henri M. Marc, Roselawn, Ohio, assignor to The Philip Carey Manufacturing Company, a corporation of Ohio Application February 8, 1946, Serial No. 646,279½

6 Claims. (Cl. 154—117)

This invention relates to the manufacture of duct turns or vanes, corner strips or similar products which are particularly useful in the construction of elbows and take-offs in air conduits for conveying air in heating and ventilating systems. They are fabricated from a fabric sheet or sheets wound in hollow tubular forms with the plies or convolutions secured together, preferably by adhesive material applied to the plies or convolutions preliminary to winding. The products may have other uses, and accordingly the invention is directed to the structure of the products rather than the uses for which they are adapted.

It has been the practice heretofore to form wound tubular products individually into desired lengths or into standard length pieces which can be cut into desired lengths for the particular size conduit in which the duct turns or vanes were to be used. The conventional practice in fabricating the products is to form them by winding or wrapping a sheet of paper such as asbestos paper upon a mandrel or core of the same form as the product to be formed with the convolutions of the paper cemented together and conforming to the shape of the mandrel or core.

The aim of the present invention is to form a master tubular member having units or segments thereof formed to the desired conformation of the duct turn or vanes and then longitudinally severing the master tubular member along lines between the units or segments. The units or segments as longitudinally divided from the master tubular element are the duct turns or vanes and are completely formed in the master construction except for the longitudinal sub-division.

Advantages of this method of manufacture are that plurality of duct turns or vanes are made in the single forming operation, the duct turns or vanes can be made by wrapping on a cylindrical roll or mandrel rather than one of special configuration, and reenforcement of the tubular duct turns or vanes is readily permitted when they are being constructed. The reenforcement may be a permanent part of the products or merely temporarily associated with them while the cementing bond becomes set.

For a better understanding of the invention reference is made to the accompanying drawing in which:

Fig. 1 is a plan view of the forming device;

Fig. 2 is a longitudinal vertical section on line 2—2 of Fig. 1, the middle part being broken away;

Fig. 3 is a rear end view of the device;

Fig. 4 is a front end view of the device;

Fig. 5 is an enlarged cross section on line 5—5 of Fig. 2 with the material in an intermediate stage of winding thereon; and exaggerated in thickness to show the convolutions or plies;

Fig. 6 is a section, similar to Fig. 5, but showing a modification of the forming device;

Fig. 7 is a partial perspective view of a completely wound master tubular member as made on the device shown in Figs. 1 to 5, inclusive, exaggerated as in Fig. 5;

Fig. 8 is a similarly exaggerated view of a completely wound master tubular member as made on the device shown in Fig. 6;

Fig. 9 is a plan view of the apparatus for severing the master tubular member longitudinally;

Fig. 10 is a longitudinal vertical section on line 10—10 of Fig. 9, with the tube thickness exaggerated and intermediate parts broken away for lack of space;

Fig. 11 is a front end elevation on the scale of Fig. 9, showing a half of a tubular member being cut into quarters on the device;

Fig. 12 is a partial perspective view of one of the vanes as made with the device of Figs. 1 to 5 and as being cut in Fig. 11, with the thicknesses exaggerated;

Fig. 13 is a partial perspective view of one of the insert strips used as shown in Figs. 5, 6, 11 and 12; and Fig. 14 is a partial perspective view of one of the vanes as made with the device of Fig. 6, having been cut from the master tube shown in Fig. 8, the thickness not being exaggerated.

Referring specifically to the drawings in which like numerals are used to designate like parts, numeral 1 is a hollow cylindrical body having head members 2 and 3 welded or otherwise secured to opposite ends. Making the body hollow is desirable because less material is required, but it could as well be solid if desired and can be of any suitably strong and rigid material. Metal construction is preferred. Head 2 has an annular flange 4 on its peripheral wall adjacent to a portion 5 which projects into the bore of the cylindrical body, and is itself also bored to receive a rod 6 projected through it and the opposite head to mount the cylindrical body thereon. A screw threaded recess 7 is formed in the head 2 to receive a set screw positioned to impinge against the rod which is projected through the cylindrical body for holding said cylindrical body thereon.

Head 3 is also centrally bored for the same purpose as head 2. The head has a central hub 8 with a projecting portion 9 of a diameter to fit within the bore of cylindrical body 1 for attaching the head thereto. A ring 10 is adapted to be mounted on head 3 to snugly seat within the recess formed therein and project beyond the periphery of the cylindrical body to the same extent as flange 4 on the head 2. The ring 10 may be secured in place on the head by any suitable means such as one or more clips 11 pivoted at 12 to the end of head 3. The clips may be readily turned either to engage the ring and hold it in place or to release it so that the master tubular member, hereinafter described, may be readily removed from the roll or cylinder after being formed thereon.

The flange 4 and the ring 10 are each provided with recesses 13 disposed at spaced apart intervals between intervening portions 14. The bottoms of the recesses 13 may be advantageously crowned or arched or otherwise shaped to conform to the shape of the insert strips which are employed, as hereinafter described, in the formation of the master tubular member on the roll or cylinder. In this embodiment of the roll or cylinder (Figs. 1 to 4, inclusive) four recesses are provided and these are spaced an equal distance apart since the roll or cylinder is designed to form a master tubular member which is to be divided longitudinally into quadrants.

The flange 4 and ring 10 are also each provided with a recess 15, and the hollow cylindrical body is grooved or recessed at 16 in alignment with the recesses 15. A key 17 having a head 18 is of a size to be fitted into the recesses with an end of a sheet of paper between the key and the roll or cylinder, which paper sheet is to be wound about the cylindrical body on its periphery between the flange and ring.

Duct turns or vanes are preferably made of fire-proof or fire-resistant material, such as asbestos paper. Therefor, to form the master tubular member 19 (Figs. 9 and 10) a sheet of asbestos paper of suitable thickness and weight is wound about the cylindrical body after the end thereof has been secured thereto by the key. Preferably about four convolutions of the sheet are wound about the roll or cylinder with a heat resistant adhesive applied between the convolutions. These four convolutions will make up the inner cylindrical section 20 of the master tubular member. Four arcuate insert strips 22 are then placed in spaced apart relation about the cylindrical section 20 with the opposite ends of each strip seated in the respective recesses 13 in the flange and ring. Arcuate insert strips are preferred inasmuch as the convex sides 23, opposite the concave sides 24, cooperate in shaping the subsequent convolutions wound about the inserts and superposed on the inner cylindrical section 20 to make up an outer substantially cylindrical section 25, this outer cylindrical section also preferably containing about four convolutions. The same sheet of paper used for forming the inner section 20 may be continued to form the outer cylindrical section or a separate sheet or sheets may be used. The convolutions of the outer cylindrical sections are also adhesively secured together. When a thinner or lighter asbestos paper is used in forming the convolutions of the master tubular member, the number of convolutions in the inner cylindrical section 20 and the outer substantially cylindrical section 25 may be increased to give the desired wall thicknesses for the completed duct turn or vane.

After the master tubular member has been fabricated, it is removed from the end of the metal cylindrical roll by withdrawing the key to release the end of the paper and turning clips 11 for removing the ring 10. The master tubular member is then severed longitudinally along lines 26 to divide same into quadrants 27. If desired, the longitudinal edges along which the quadrants have been severed may be dipped into a solution of sodium silicate or have it brushed thereon to further secure and smooth their edges. The quadrants are suitable for being cut into desired lengths for use as duct turns or vanes and may be impregnated with sodium silicate, resins or other suitable hardening agents to increase their strength and rigidity and may be surface coated or finished as desired.

The master tubular members are made up conveniently in lengths of about thirty-six (36") inches, and the quadrants cut therefrom will be of the same length. They comprise an inner section composed of four or more layers or plies 28 and an outer section composed of four or more layers or plies 29 of paper with the arcuate insert interposed between the inner and outer sections. The inserts, while preferably arcuate where the master tubular member is divided into quadrants may be of any suitable shape. The convex side of the insert helps in giving the desired curvature to the outer sections of the quadrants.

The hollow cylindrical metal body 1' in the modified form of roll or cylinder (Figs. 5 to 8, inclusive) is of the same general construction as that in Figs. 1 to 4, inclusive, the chief difference being that it is of larger diameter to produce a larger master tubular member, and the larger tubular member is divided into more than four divisions. The insert strips 22' are flat rather than arcuate and the recesses 13' in the flange 2' and annular ring 10' are accordingly made with flat bottoms 15' rather than arched as in the modification in Figs. 1 to 4 inclusive. However, it will be understood that the insert pieces in either modification may be of any desired form. Moreover, one or more insert pieces may be used in each of the divisions and these may be of the same or different shape.

The insert pieces are of any suitable material or composition and may be left as permanent parts of the master tubular members or the divisions thereof, or they may be withdrawn after the master tubular members or the divisions thereof are formed. If the inserts are to be left as permanent parts, they are preferably paper strips of the same material as that used in forming the master tubular members and are preferably adhered in place. However, if the insert strips are merely to be used for forming the master tubular members and thereafter withdrawn for repeated use, they are preferably of more substantial material, such as metal, and are not adhered in place.

The device in Figs. 9, 10 and 11, typifies one suitable for dividing the master tubular member longitudinally along straight even lines to form the individual duct turns or vanes. It comprises a cylindrical form 30 having a vertical slot 31 through its center, from the front end, to accommodate a band saw 32. The form is mounted on a base bracket support 33 by means of screws 34 projecting into the form through portions 35 at its bottom (Fig. 11). Fitted into the top of the form by screws 36 is a metal strip 37 of rather narrow thickness, the front edge portion 38 being narrowed as compared with the back edge portion 38', to render it wedge-shaped. On the bottom of the form, diametrically opposite to this metal strip, is fin 39 of the support and this extends a substantial distance to the back of the form 30.

As the master tubular member is pushed on the front end of the form, it is sawed apart vertically into halves. The metal strip and the fin are in vertical alignment with the saw blade and are slightly thicker than the saw blade, thereby slightly pushing apart the several halves of the master tubular member. While this first cutting operation is being done, the arm 40, pivoted at 41 to the front end of the roll or to a member 42 which is attached by screws 43 to the end of the form, is moved to the position shown in Fig. 9 so as not to extend beyond the circumference of the form and into the path of the master tubular member as it is fed onto the form. Thereafter, however, the arm is pivoted outwardly to the position shown in Fig. 11 so that it will be closely adjacent the side of the roll, and the top surface will form a guide support for one edge of the half sections into which the master tubular member has been divided while the half sections are fed into the saw to divide the half sections into quadrants. This cutting device provides for the accurate quartering of the master tubular member into equal sized quadrants and along straight longitudinal lines.

Having described the invention in details both as to forming of the master tubular members, a suitable device on which said members are formed, and a suitable device by which said members may be accurately divided, it will be understood that there may be wide change in these details of construction without departing from the spirit of the invention.

I claim:

1. A method of making a tubular member adapted to be subdivided into duct turns or vanes comprising winding a convolution of fabric about a mandrel, placing spacing strips longitudinally at circumferentially spaced intervals about the mandrel upon the fabric convolution, then winding another fabric convolution around the first fabric convolution and over the strips, and securing the convolutions together along zones between the strips.

2. A method of making duct turns or vanes comprising forming a tubular member having segments shaped to predetermined form, and longitudinally dividing the member between the segments.

3. A method of making duct turns or vanes comprising winding a convolution of fabric about a mandrel, placing spacing strips longitudinally at circumferentially spaced intervals about the mandrel upon the convolution of fabric, then winding another convolution of fabric around the first convolution of fabric and over the strips, securing the convolutions of fabric together in zones between the strips, and severing the resulting structure along longitudinal lines between the strips.

4. A method of making duct turns or vanes comprising winding a convolution of fabric about a mandrel, placing narrow spacing strips longitudinally at circumferentially spaced intervals about the mandrel upon the convolution of fabric, then winding another convolutoin of fabric around the first convolution of fabric and over the strips with the convolutions of fabric contacting in zones between the strips, securing the convolutions together along the zones of contact, and severing the resulting structure longitudinally along the zones of contact.

5. A method of making duct turns or vanes comprising winding a convolution of fabric about a mandrel, placing narrow spacing strips longitudinally at circumferentially spaced intervals about the mandrel upon the convolution of fabric, then winding another convolution of fabric around the first convolution of fabric and over the strips with the convolutions of fabric contacting in zones between the strips, securing the convolutions together along the zones of contact, severing the resulting structure longitudinally along the zones of contact, and applying adhesive indurating material to the severed longitudinal edges.

6. A method of making duct turns or vanes comprising winding convolutions of fabric about a mandrel to build up a laminated inner section, placing narrow spacing strips longitudinally at circumferentially spaced intervals about the mandrel upon the laminated inner section, then winding convolutions of fabric around the laminated inner section and over the strips to form a laminated outer section with portions of the laminated inner and outer sections contacting along longitudinal zones between the strips, securing the inner and outer laminated sections together along the contacting zones, and severing the resulting structure longitudinally along the zones of contact.

HENRI M. MARC.

REFERENCES CITED

The following references are of record in the file of this patent:

UNITED STATES PATENTS

| Number | Name | Date |
| --- | --- | --- |
| 684,604 | Dixon | Oct. 15, 1901 |
| 775,562 | Golliek | Nov. 22, 1904 |
| 1,800,538 | Johnson | Apr. 14, 1931 |
| 1,930,285 | Robinson | Oct. 10, 1933 |
| 2,126,833 | Steinberger | Aug. 16, 1938 |